UNITED STATES PATENT OFFICE.

HOWELL W. WRIGHT, OF GLASTENBURY, CONNECTICUT, ASSIGNOR TO ALBERT CHAPMAN, OF SAME PLACE.

IMPROVEMENT IN ALLOYS OF NICKEL, ZINC, AND COPPER.

Specification forming part of Letters Patent No. 141,530, dated August 5, 1873; application filed February 25, 1873.

*To all whom it may concern:*

Be it known that I, HOWELL W. WRIGHT, of Glastenbury, in the county of Hartford and State of Connecticut, have invented a certain new and useful Improved Alloy, of which the following is a specification:

This alloy consists of American commercial nickel (which contains about twenty-five per centum of copper) and zinc in about the proportion of one hundred pounds of zinc to from twenty-five to thirty-four pounds of the American commercial nickel.

The nickel is improved for the purposes of this alloy by a preliminary process of refining, as follows: Take, say, one hundred pounds of the nickel, melt it and continue the heat till the nickel bubbles. If the melted nickel shows traces of dirt, cobalt, or iron, add about two ounces of soda-ash as a flux and stir till the nickel boils or bubbles in the center. If the nickel shows cobalt in excess, add about two ounces of nitrate of soda as a flux, and stir till the nickel boils or bubbles in the center. If the nickel shows arsenic, common salt in same quantity may be used as a flux. If the nickel shows sulphur, carbonate of soda in about the same quantity may be used as a flux. The nickel may now be cast into sheets, and is now refined and purified.

The alloy is to be produced by melting the zinc in any proper manner, as in a crucible, keeping the zinc covered meanwhile with powdered charcoal or other equivalent carbonaceous matter. The heat is continued after the zinc is melted under the cover of the charcoal. When raised to a trifle above the melting-point of copper the nickel is added in small strips or pieces, and the heat continued till the whole is melted, the melting metal being kept covered all the while with the powdered charcoal, and when melted the alloy is cast into ingots, the charcoal flowing out with the alloy and forming a coating on the ingot. The whole is allowed to cool together.

This alloy is specially useful in making German silver. By remelting this alloy under charcoal as before, and adding copper till the per centum of nickel is reduced to anywhere from one to twelve per centum of the whole, a good German silver may be formed, the richness of the metal varying with the per centum of the nickel.

This alloy, when added to any metallic compound containing copper, bleaches, whitens, and strengthens it.

Common pin metal is usually composed of two parts of copper to one of zinc. By adding this alloy till there is a full quarter more of zinc in the composition I can produce a cheaper article and at the same time a better one.

I have heretofore in this specification treated this alloy as composed of zinc and American nickel, the latter containing about twenty-five per centum of copper. If I were using a nickel which did not contain about that per centum of copper, I should, when melting the zinc, add enough copper to make up about the twenty-five per centum when the zinc had arrived at the melting-point of copper, and then, continuing the heat, add the nickel when the zinc and copper arrived at the melting-point of nickel.

I claim as my invention—

An alloy of copper, nickel, and zinc in about the proportions specified.

HOWELL W. WRIGHT.

Witnesses:
 WM. E. SIMONDS,
 JOHN POLLITT.